Figures 1, 2:
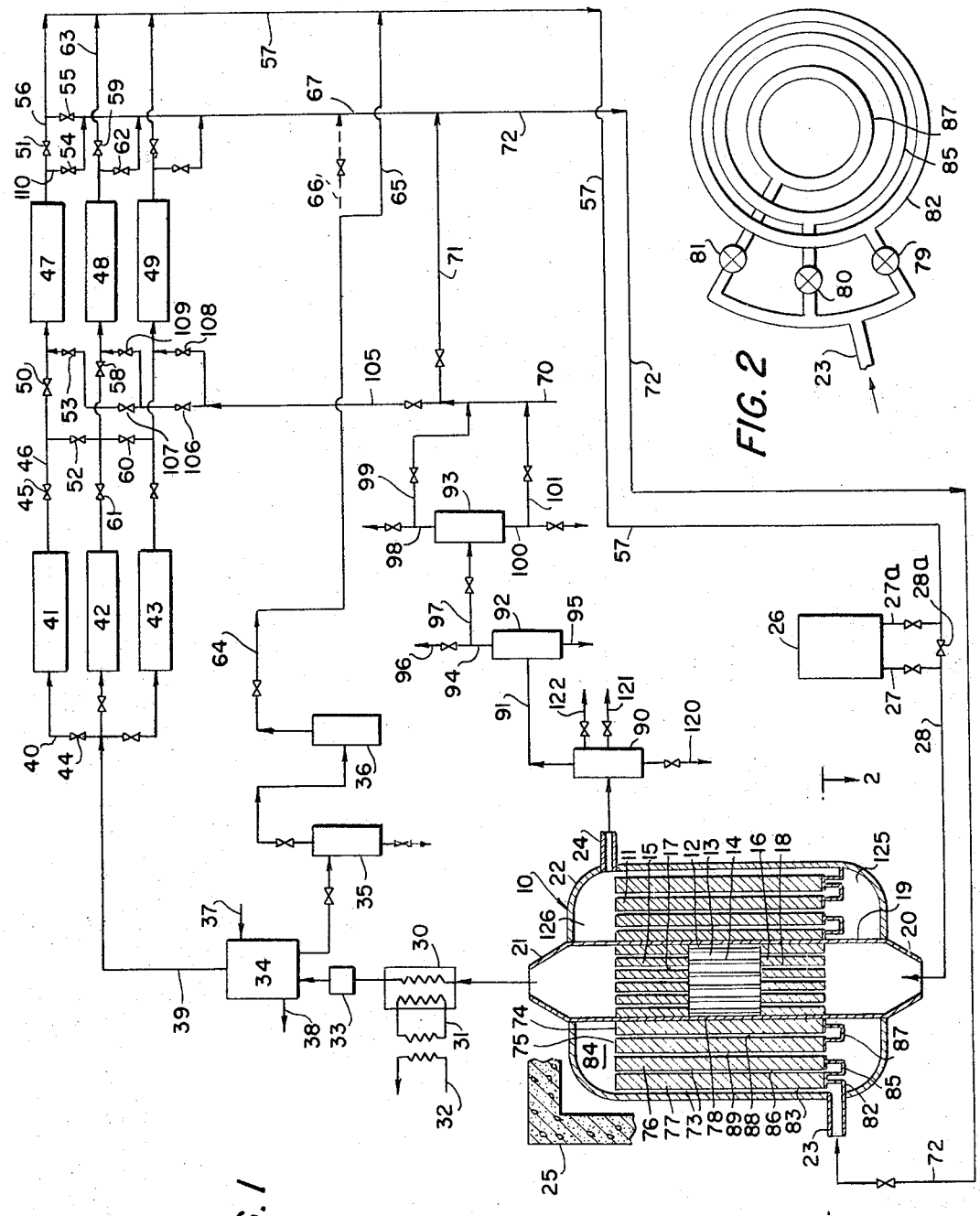

Dec. 27, 1966   E. O. GUERNSEY   3,294,643
METHOD OF OPERATING A NUCLEAR REACTOR AND OF
CARRYING OUT RADIATION CHEMICAL REACTIONS
Filed March 24, 1964

INVENTOR.
EDWIN O. GUERNSEY
BY
ATTORNEY

United States Patent Office 3,294,643
Patented Dec. 27, 1966

3,294,643
METHOD OF OPERATING A NUCLEAR REACTOR AND OF CARRYING OUT RADIATION CHEMICAL REACTIONS
Edwin O. Guernsey, Pennington, N.J., assignor to Mobil Oil Corporation, a corporation of New York
Filed Mar. 24, 1964, Ser. No. 354,303
12 Claims. (Cl. 176—37)

This invention relates to a method of operating a nuclear reactor and coincidently therewith of carrying out in the reactor a radiation-induced chemical reaction. While the reactor can be operated for many useful purposes, for the sake of illustration its operation to produce power will be specifically described, it being understood that it can be used for other purposes.

As is known, a nuclear reactor system generally includes a reactive core containing fuel and a moderator, a reflector, control rods or elements, a coolant for removing heat, and shielding. The amount of fuel is at least equal to the critical amount, and in practice is greater because a reactor having only the critical amount and no more will operate but a short time, or until the amount is depleted by burnup so that it becomes less than critical. Practically, therefore, the amount of fuel used in a power reactor is enough to provide criticality and also to provide an excess so that burnup of fuel may continue over a desired period of time before additional fuel is necessary.

During fuel burnup, many nuclear fission products are formed, including the gas xenon-135 resulting from the decay of iodine-135. Xenon-135 is of particular interest because of its high sigma, or capture cross-section for thermal neutrons, amounting to $2.6 \times 10^6$ barns, by virtue of which it may bring about a serious loss of neutrons. Other fission products also absorb neutrons, but by comparison with xenon-135 their effect is negligible. The xenon-135, after shutdown of a reactor, increases in concentration and thus is capable of preventing startup by its potential for absorbing so many neutrons as not to leave enough to sustain a nuclear fission chain reaction. This follows from the fact that after shutdown, xenon-135 continues to form by decay of iodine-135 but is not consumed. The decay chain, with half lives, is given as follows: Te (less than 2 min.) →I-135 (6.7 hrs.) →Xe-135 (9.2 hrs.) →Cs-135 ($3 \times 10^6$ yrs.) →Ba-135. During progress of the fission reaction, xenon-135 is consumed, for upon absorbing a neutron, it becomes xenon-136, which does not have a large capture cross-section. To achieve a self-sustaining nuclear fission reaction at some time after shutdown, enough fuel must be present or added so that the neutron production therefrom will override the losses to the xenon-135. The latter is regarded as a reactor poison owing to its large capacity to absorb neutrons.

In these circumstances, removal of xenon-135 from the reactor core has been regarded as desirable and even necessary. In the case of a high temperature gas-cooled reactor, for example, removal of the xenon-135 and other volatile fission products can be accomplished by means of an inert sweep gas which continuously purges the fuel regions and which coincidently serves as coolant. The xenon-135 and other volatiles are carried out of the reactor by the sweep gas and later separated therefrom. It will be appreciated, in this connection, that although the xenon-135 is not a primary fission product, there is ample opportunity for it to form in the reactor in accordance with the foregoing decay chain.

According to the invention, a novel combination of steps is employed in the operation of a nuclear reactor, including, in the first place, the steps of operating the reactor and of carrying out the described radiation chemical reactions. Incident thereto is the step of removing xenon isotopes and their iodine precursors as well as other volatile fission fragments, including krypton and bromine isotopes, from the reactor core.

Another step comprises using the xenon and/or the krypton to promote a chemical reaction involving gaseous reactants. These rare gases are of value as directors or sensitizers for radiation-induced chemical reactions, being capable in many such reactions of increasing the yield of valuable products per unit of energy absorbed by the reactant.

Cooperative with the last step is the step of using the chemical reactant to carry the sensitizer into the reactor, and more particularly into a chemical reaction zone associated therewith and forming a part of the same, where the mixture is subjected to nuclear radiation as well as to the heat produced by the fission reaction.

A further step involves returning a desired portion of xenon-135 to the reactor core where it acts as a neutron absorber. The xenon-135 is used in a controlled concentration to absorb neutrons present in a greater concentration that is necessary to support a chain reaction. The xenon-135 becomes xenon-136 by absorption of a neutron and thus comprises a burnable poison. One advantage of this step is that over a period of operation, the lifetime of the fuel is extended by virtue of the presence of the xenon-135, and it is to be noted that its concentration is reduced as fuel content is reduced. A further advantage is that a measure of control is provided over the reactivity of the core such as to dispense with the use of some of the control rods. In particular, the xenon-135 is useful to control any reactivity changes that occur slowly. All reactivity effects can of course be controlled by means of control rods, but it is more economical to use control rods for fast changes of reactivity and to employ the recirculated xenon-135 to control slow changes. As a result, fewer control rods and necessary operating mechanism will be required, and also decreased maintenance thereof, thus affording a considerable economy. Further, use of the xenon-135 will lessen radiation damage of the rods and decrease consumption of the same.

A further step of the invention comprises recovering a portion of the xenon-135 or other xenon or krypton isotopes, as useful byproducts. Suitably, xenon-135 may be used prior to decay, in an adjacent facility, such as a nuclear reactor, where it may serve as a burnable poison. It also has other utility as a radioactive isotope, etc.

As noted, besides the xenon isotopes, the krypton isotopes may be used as sensitizers for the chemical reaction. Any one is useful separately, or as a mixture with one or more others, and may be recovered after such use. Xenon-135, however, is a useful material for recirculation to the fuel, owing to its large capture cross-section.

The foregoing steps are set forth in greater detail in connection with the accompanying drawings, which are highly diagrammatic, and in which FIG. 1 is a flow diagram illustrating the method and including a partial, cross-sectional view of a nuclear reactor; and FIG. 2 is a partial view taken along the line 2—2 of FIG. 1.

The flow is centered about a high temperature gas-cooled reactor 10 provided with a generally cylindrical neutron-reflecting blanket or reflector 11 of impervious graphite and with a core 12 in which are disposed elongated cylindrical fuel elements 13 each comprising a mixture of a moderator of pervious graphite and a suitable fuel such as a mixture of uranium-235 and thorium-232.

The disposition of fuel elements is such that a regular arrangement of vertically extending passages, generally indicated at 14, is formed between the elements. Above and below the core are groups 15 and 16 of reflector, these also being penetrated by a regular arrangement of channels 17 and 18. The core and the reflector groups 15 and 16 are disposed in an elongated cylindrically shaped section or tube 19 disposed more or less centrally of the reactor and having an inlet 20 and outlet 21. Tube 19 is concentrically disposed within blanket 11 and both are arranged in a pressure-resistant housing 22, which also functions as a pressure shield and which is provided with inlet and outlet means 23 and 24. A biological shield is partly shown at 25, and it will be understood that a conventional thermal shield, not shown, is provided as well as suitable control rods, not shown, disposed for movement in the reactor core and operating mechanism therefor.

Coolant gas, such as helium, which is not made radioactive by the radiation, is drawn from tank 26 and flows through valved lines 27 and 28 into inlet 20, channels 18, passages 14, and channels 17, leaving the reactor by outlet 21. During such passage the coolant picks up and sweeps out from the fuel a number of volatile fission products, including xenon, krypton, iodine, and bromine, which are of particular interest to the invention. Non-volatile fission products are absorbed by the fuel mixture, although a small amount may find their way into the coolant stream. While the coolant flow through the reactor core may be in any direction, it is preferably upward as the coolant expands with heat and upward flow enables it to pass in the direction in which it expands. Use of upward flow also means that the supporting structure (not shown) for the fuel elements is not heated by the hottest coolant gas.

Helium may enter the reactor at any suitable temperature, say 500 to 600° F. or more, and at about 300 p.s.i., and may leave at about 1100 to 1200° F., or more, passing to heat exchanger 30 where its heat is transferred to a working fluid such as steam flowing in the loop 31. Heat from the steam may then be transferred to a second working fluid, such as steam, in the loop partly shown at 32 which may be used to operate a turbine (not shown), after which it is recirculated in loop 32. If desired, loop 31 can be omitted, and heat transfer effected from exchanger 30 to loop 32.

The helium stream leaving heat exchanger 30 may be at a temperature of 400 to 600° F. It desirably is passed through one or more electrical precipitators, one of which is represented at 33, to remove any solid particles comprising non-volatile fission products. In the precipitators, which suitably are of tubular form, a high voltage field is applied to the flowing stream to fix any solid particles dispersed therein against the internal walls of the tubes, thereby separating the particles from the coolant. Thereafter the stream is cooled in zone 34 to reduce its temperature so that its content of iodine-135 liquifies, suitably in the range of 300 to 360° F. At this temperature level bromine, xenon, and krypton are gaseous. Liquid iodine is collected and removed to a storage zone 35 where it decays to xenon, including the isotope xenon-135. The gaseous xenon flows to storage in tank 36, from which it may be withdrawn as required.

It will be understood that a number of iodine isotopes may be present in the coolant stream leaving the reactor and will decay to various xenon isotopes prior to the foregoing iodine-removal step. These xenons will pass with the main coolant stream as it leaves zone 34 and enters line 39. Similarly, a number of iodine isotopes may be present in zone 35, decaying to various xenon isotopes. While, therefore, several xenon isotopes will no doubt be present in the xenon storage tank 36, there is sufficient xenon-135 present to provide burnable poison when recirculated to the reactor core.

In the cooling step in zone 34, process steam may be produced, cooling water entering at 37 and the steam being removed at 38.

The cooled helium stream with its content of xenon, krypton, and bromine flows by lines 39 and 40 into and through a bromine removal zone comprising an absorber 41 containing a packed bed, preferably of a ceramic material impregnated with silver nitrate, in order to convert radioactive bromine to solid silver bromide and thus remove it from the coolant stream. A group of absorbers is preferably used, comprising units 42 and 43 as well as 41, and as one becomes spent, it is cut out by suitable operation of the valves shown in its inlet and outlet lines. Thus, as absorber 41 becomes spent, it is cut out by closing valves 44 and 45, a fresh absorber 42 or 43 is cut in by opening the valves (previously closed) in its inlet and outlet lines and of course closing those of the spent absorber. In the spent absorber 41 the radioactive bromine in the form of silver bromide is allowed to decay to krypton, and if desired, during the decay process the absorber may be physically replaced by a fresh unit. While three absorbers are shown, more may be employed as desired.

Effluent from an operating absorber, say absorber 41, comprising coolant and the rare gases xenon and krypton, flows by line 46 to an absorber or trap 47 for removal of the rare gases. The trap 47, which is one of a series comprising traps 48 and 49, and including additional units as desired, contains a stationary preferably agitatable mass of granular solid material, such as silica gel but preferably activated charcoal or active carbon, as the absorbent of the xenon and krypton. These traps are preferably operated at very low temperatures, going down to −280° F. or below. Each trap may comprise a single stage, or a plurality of stages with the coolant stream flowing from one stage to another within one trap. If one stage per trap is used, the temperature may suitably be about −280° F. and may be attained by the use of liquid nitrogen as a refrigerant. If two or more stages per trap are employed, progressively lower temperatures may be used throughout the trap, ranging from about 150° F. in the first stage, attained by using tap water, to about −280° F., or even as low as −320° F., in the last stage, using liquid nitrogen. Each stage comprises an inner chamber containing the granular absorbent through which the coolant stream flows and an outer surrounding chamber through which the refrigerant may flow. It is desirable to provide for both remote and manual handling of each stage and of the valving therefor. Each trap should also be isolatable and replaceable.

As shown in the drawing, each trap is valved for individual operation. The coolant stream from absorber 41 flows through trap 47, valves 50 and 51 being open and 52, 53, 54, and 55 being closed, and the stripped helium leaves by line 56, returning by line 57 to tank 26 and the reactor inlet 20. When trap 47 is spent, the coolant stream may be diverted to trap 48 by operation of the valves in its inlet and outlet lines. Thus, the previously closed valves 52, 58, and 59 are opened so that the stream may flow from line 46 through trap 48, while valves 50 and 51 are closed, and it will be understood that valves 60, 61, and 62 are also closed. From trap 48 the stripped helium flows by line 63 to line 57 and thence to storage tank 26 and reactor inlet 20. In a similar way, trap 49 can be cut into the flow.

It will be noted that the coolant stream entering a trap may come from any of the absorbers 41, 42, or 43, and as the operation is clear from the drawing, no further description is thought necessary. Each trap or stage thereof is preferably operable continuously for at least a month and is either disposable or regeneratable. The traps may be regenerated by heating the inner chamber containing the absorbent and absorbed rare gas while coincidently applying a vacuum to the chamber interior, or by heating while flushing the absorbent with a gas like hydrogen or helium. During on stream operation, frequent switching from one trap to another may help to minimize any risk of channeling.

Xenon gas rich in xenon-135 is added to the stripped helium in line 57 so that coolant recirculated through the reactor core will carry with it burnable poison in the form of the xenon-135, thereby to secure the measure of control over the core reactivity, to help prolong the lifetime of the fuel, and to secure the other advantages previously described. The xenon is taken from storage tank 36 through lines 64 and 65 in amounts suitable to effect the desired purpose. The xenon may be added to the recirculating helium prior to storage in tank 26, as shown, or after the helium leaves tank 26, the addition being made to line 28.

The foregoing description illustrates the coolant loop of the method, involving circulation of the coolant through the reactor core, heat exchangers, halogen-and rare gas-removal zones, then the addition thereto of the burnable poison, and finally its reentry into the reactor core. The method also involves a second loop in which chemical reactant flows and which will now be described.

The chemical reaction may be any one of a number of gas phase radiation-induced reactions capable of being benefited by the presence of a gaseous sensitizer, that is, reactions in which the presence of the sensitizer results in an increase of the yield of product per unit of radiation energy absorbed by the reactant. Suitable reactions include hydrocarbon cracking and reforming, hydrocracking, hydrorefining, hydrogenation of organic compounds, polymerization of olefins, alkylation of paraffins with monoolefins, telomerization of alcohols and other compounds, oxidation, and miscellaneous reactions such as the conversion of ammonia to hydrazine, the fixation of nitrogen, and the like. It is considered that the sensitizer absorbs radiation energy directly and transfers the same to the reactant, producing certain select species, at least in some cases. In other words, the sensitizer directs the use of the energy which it absorbs and tends to improve yields and selectivity of product. Whatever the mechanism, it is proposed to subject a reactant to the ionizing radiation from the nuclear reactor at elevated temperatures and in the presence of a gaseous radiation acceptor comprising a rare gas sensitizer such as xenon or krypton to produce a useful product. Any xenon or krypton isotope is contemplated as suitable for this purpose. The reactant may be normally gaseous or it may be gaseous at reaction conditions; as used herein the term reactant is intended to include one or more substances.

Reactant is introduced to the chemical reaction loop by line 70 and flows by lines 71 and 72 to the inlet 23 of the reflector or blanket 11 of the reactor 10. Xenon sensitizer from tank 36 may be added to the reactant stream in line 72 by passage through lines 64, 66, and 67, the flow through line 66 being indicated by a dashed line to show that it is optional. As will appear, alternatives exist for introducing sensitizer to the reactant. The resulting reactant-sensitizer mixture will be referred to as the reactant mixture or stream.

The blanket 11 comprises the chemical reaction zone, and as indicated, has a generally cylindrical construction, being formed of impervious graphite and being penetrated by vertically extending passages 73 in which the chemical reaction takes place. The blanket itself may preferably comprise a group of concentrically disposed, radially spaced cylinders 74, 75, 76, and 77; or it may comprise a plurality of concentric rings with each such ring being formed of graphite blocks and each ring radially spaced from an adjacent ring. For purposes of the invention, any blanket construction is suitable which provides adequate neutron-reflecting capability and which is penetrated by passages such as at 73. Considering the blanket to be formed of spaced cylinders 74, 75, 76, and 77, it will be apparent that there are four annularly-shaped spaces which may constitute the chemical reaction zone and through which the reactant mixture may flow in a bottom to top direction.

The reaction zone in the reflector is heated by heat exchange with the reactor core and may attain a temperature in the over all range of 300 to over 900° F. Pressure will depend on the particular chemical reaction that is carried out but may range up to about 500 p.s.i. or more. The reactant mixture may receive a radiation does rate of up to 500 megarads per hour, comprising mainly neutrons and gamma, but not fission fragments as these are prevented by the moderator and the reflector, and particularly by the impervious wall 78 of tube 19, from reaching the reactant mixture. Total radiation dose received by the reactant mixture will depend on several factors, including the time during which the reactant traverses the reaction zone, which may vary from several seconds to several minutes, say from about 10 seconds to 2 or 3 minutes. The foregoing conditions are to be understood as illustrative.

More particularly, the temperature in the chemical reaction zone may be selected, so to speak, to suit a particular reaction. This capability is based on the fact that the temperature in the reflector varies with the distance from the reactor core, i.e., these areas nearer the core have a higher temperature than those more remote. Provision for temperature selection is apparent in the drawing where a chemical reactant mixture may be introduced to one of several reaction zones. The mixture enters the reactor by line 23, note FIG. 2, and may be passed through an outer or low temperature zone by opening valve 79 and closing valves 80 and 81, the mixture flowing in the outer ring-shaped passage 82, then upwardly in the outer reaction zone 83, then into header space 84 and out through line 24. Or by opening valve 80 and closing valves 79 and 81, the mixture may be passed through passage 85 into intermediate reaction zone 86, which is at an intermediate temperature, and from which it leaves through header space 84 and line 24. Or by opening valve 81 and closing valves 79 and 80, the mixture can be passed through passage 87 into the inner reaction zone 88, which is at the highest temperature, leaving such zone in the manner described. It is considered that the temperature in the outer zone may be in the range of 300 to 600° F., that in the intermediate zone may range from 500 to 800° F., and that in the inner zone from 800 to 950 or 1000° F. Suitably, reactions like nitrogen fixation and the conversion of ammonia to hydrazine may be run in the outer zone; reactions like telomerization and hydrorefining in the intermediate zone; and reactions like cracking in the inner zone. It will be noted from the drawing that a second intermediate zone 89 is available, if necessary.

The use of the mixed neutron and gamma field, as described, takes advantage of the fact that a nuclear reactor comprises a source of large radiation potential and of the fact that the reactant and/or the reaction mixture does not have appreciable radioactivty. Reactions involving hydrocarbons do not become appreciably radioactive in the absence of impurities.

The resulting reaction mixture, including the reaction product, flows by line 24 to a separating zone 90 where a desired separation may be made which may or may not include the removal of product. It is desirable to take off a gaseous stream by line 91 which will contain the sensitizer gas or gases, and which may or may not contain unreacted gaseous reactant, and pass the same to one or more subsequent separating zones 92 and 93 for the recovery of the sensitizer. As indicated, xenon and krypton constitute useful products. Unchanged reactant may also be recovered for reuse in the process. Thus, the stream in line 91 may be separated in zone 92 into a sensitizer fraction, which is withdrawn by line 94, and an unchanged reactant fraction which is removed by line 95 and preferably recycled by means not shown.

The sensitizer fraction may be passed through line 96 to storage or recycled by means not shown to the reactant in line 70. Alternatively, the sensitizer fraction, which comprises both xenon and krypton, may be further processed to separate these. The sensitizer stream in line 94 is diverted through line 97 to a low temperature separator 93 where the temperature is maintained below −109° C., at which xenon boils, but above −152° C., at which krypton boils. The krypton is thus removed through line 98 and either recovered or added by line 99 to the reactant in line 70. The xenon may be removed through line 100 and used as desired, either being recovered or sent back as a sensitizer in the process through line 101 to the reactant in line 70.

After the process has been in operation for a time sufficient to accumulate rare gas in traps 47, 48, or 49, it is possible to form the reactant-sensitizer mixture by flowing reactant from line 70 into line 105 and thence through one of the rare gas laden charcoal traps to pick up sensitizer and then to pass the mixture to the chemical reaction zone. For example, reactant in line 70 flows by line 105 through valves 106, 107, and 53 into line 46 (valves 108 and 109 being closed) and then through trap 47 where it picks up sensitizer. Control over the amount of sensitizer picked up is available by suitably heating the contents of the trap a desired extent. Reactant and sensitizer then leave the trap and flow by lines 56, 110, 67, and 72 to the inlet side of the chemical reaction zone, it being understood that valve 54 is open and valves 51 and 55 are closed. It will be understood of course that trap 47 is closed to the flow of coolant therethrough. In a similar way, reactant from line 70 may flow through traps 48 or 49, and as these flows are readily apparent, no further description is thought necessary.

As indicated, another way of forming the reactant-sensitizer mixture is to introduce xenon from tank 36 through lines 64, 66, and 67 to reactant feed line 72.

The amount of rare gas sensitizer is widely variable, ranging up to 99 mole percent of the chamical reactant mixture. Preferably it is used in amounts of 10 to 90 mole percent. As may be evident, it is useful in large proportions of the reactant mixture.

A suitable radiation-induced chemical reaction which may be carried out is the conversion of gaseous ammonia to hydrazine in the presence of xenon or krypton or both. Use of the sensitizer improves the selectivity of conversion to hydrazine and results in a yield of the latter that is several times greater than that obtainable in the absence of the sensitizers. On the basis of G value (number of molecules of hydrazine per 100 electron volts of radiation energy) the sensitized reaction may give a G of about 2 for the formation of hydrazine, whereas in the absence of sensitizer the G may be only a tenth or so, although some observers report no yield at all. The reaction may be carried out at temperatures up to 300° F. or more, pressures sufficient to provide a suitable flow rate, and at rediation doses on the order of 10 to 500 megarads per hour. Illustrative ammonia flow rates may range up to 100 cm./sec. or more. In order to recover the hydrazine, the effluent from the chemical reaction zone may be suitably cooled in the separator 90 by means not shown to condense the hydrazne, which boils at 113.5° C. at atmospheric pressure, and the hydrazine withdrawn by line 120. The unreacted ammonia plus the sensitizer may be removed through line 91 and passed to separator 92 where they are separated, the sensitizer leaving by line 94 and the ammonia by line 95. Both may be reused. As is apparent, separator 92 is operated at a low temperature.

Another reaction of interest is the telomerization of a low molecular weight alcohol with a low molecular weight olefin to form one or more product alcohols of higher molecular weight. For example, isopropanol may be telomerized with ethylene in the vapor phase at a pressure of 0.1 to 10 atmospheres, a temperature of up to 300° C. (572° F.), an exposure time of a few seconds up to one or two minutes, and a total radiation dose of 0.1 to 5 or 10 megarads. Suitably the mole ratio may range from 0.5:1 to 40:1, isopropanol to ethylene. Total G values of product alcohols are in the range of 50 to 300. To recover the telomer products, the effluent from the chemical reaction zone may be fractionated in the separator 90 to produce telomer products of progressively increasing boiling point, including C–5, C–7, and C–9 tertiary alcohols, which are recovered from the fractionator through tlines 122, 121, and 120. Unreacted ethylene and isopropanol, plus sensitizer, are withdrawn through line 91, passed to separator 92, where isopropanol is removed by line 95 and the ethylene and sensitizer by line 94, the latter stream then being passed by line 97 to separator 93 where a further separation is made, the sensitizer being withdrawn as a gas through line 98 and the ethylene in liquid form through line 100. Separator 93 in this case is operated at low temperature.

Another reaction of interest is the fixation of nitrogen. Air, comprising nitrogen and oxygen, is passed through the chemical reaction zone and the effluent stream is suitably cooled and compressed to remove nitrogen dioxide and nitrous oxide, the former being the main product of interest and the latter a valuable byproduct. This reaction may proceed at temperatures of up to 200 or 300° C. (392 or 572° F.) a pressure of up to 300 p.s.i., and a radiation dose of up to 100 or 200 megarads. With respect to nitrogen dioxide a G of at least 4 is possible, and for nitrous oxide the G may be at least 2. The nitrogen dioxide product may be recovered by suitably cooling the effluent reaction mixture in the separator 90 by means not shown, the nitrogen dioxide condensing at about 21° C. at atmospheric pressure. It is directly convertible to nitric acid. The balance of the reaction mixture, comprising unreacted nitrogen and oxygen, nitrous oxide, and sensitizer may be withdrawn through line 91 and, if desired, passed to another cooler not shown to condense out the nitrous oxide, after which the mixture may be passed to separator 92 to recover the sensitizer by low temperature means comprising liquefying the sensitizer to effect separaton from the nitrogen and oxygen. Unreacted nitrogen and oxygen can be discarded by means not shown.

It will be understood that the flow illustrated is merely diagrammatic and does not show compressors, circulators, relief valves, and the like.

Referring again to the reactor 10, it may be noted that other fuels are operable therein beside that described. Thus, the fuel may be U–233, U–235, or Pu–239, either singly or together and either in the metal or oxide or carbide form. A mixture of fissile and fertile materials, e.g., uranium dioxide and thorium dioxide, is particularly suitable, and the fuel may be enriched, or fully enriched, in U–235. The proportions of the constituents of each fuel element are variable; generally the amount of fissile and fertile materials together is not above about 30% by weight of the total fuel element, the remainder comprising moderator. It is desired that the fuel remain solid at the highest temperature attained by the reactor core. The fissile and fertile materials may be disposed homogeneously throughout each fuel element or may be confined to any desired selected part thereof, as in the core of the fuel element, etc. If disposed in the core, then the surrounding graphite moderator may serve as cladding or as a sleeve for the fuel mixture. Other such cladding materials may be used, including aluminum, beryllium, or stainless steel, and as these are more or less impervious, the fuel element may have a central longitudinally extending channel for the passage of coolant; in other words, the element may comprise a mixture of fuel and graphite moderator constructed in the form of a tube, with the metallic cladding around the outside of the tube and the central channel extending along the longitudinal axis of the tube; volatile fission products may thus pass into the channel and be swept out by the coolant.

Other useful coolants include carbon dioxide, hydrogen, neon, deuterium, oxygen, etc. It will be understood that the coolant tank 26 helps provide a more uniform flow of coolant through the reactor core. It is provided with valved inlet and outlet lines 27 and 27a and a valve 28a in the line 28.

The preferred reflector material is graphite, and other suitable materials are beryllium, beryllium oxide, boron, zirconium hydride, etc. Besides the reflector, other portions of the nuclear reactor may be employed as the chemical reaction zone, provided that such portions are situated to receive the nuclear radiation and may be provided with inlet and outlet means. For example, the lower portion 125 of the reactor may serve as a chemical reaction zone and also the upper header portion 126. Other portions may include the spaces (not shown) between the various shields of the reactor. Also, by providing a plurality of concentric spaced thermal shields (not shown) outwardly of the reflector, or even pressure shields, the spaces between these may be employed as chemical reaction zones. However, the reflector is the preferred location of the chemical reaction zone.

Referring to the iodine decay zone 35, it should be mentioned that not all of the liquid iodine entering such zone will decay to xenon; thus, iodine-127 is stable and iodine-129 is long lived, and these will remain in the liquid state. Suitably, they may be recovered through the valved outlet line shown at the base of zone 35; for this purpose, zone 35 may comprise two stages or portions: a first portion in which iodine-135 decays to xenon, and a second portion in which liquid iodine-127 and iodine-129 may be collected following the decay process and from which such liquid iodine may be removed as described. The withdrawn iodine comprises a valuable product as such, and it may also be used within the process as by returning (by means not shown) at least a portion to the coolant stream flowing to zone 34 for the purpose of aiding effectively to condense the iodine in such stream in the zone 34, i.e., by increasing the iodine concentration therein.

As indicated, the nuclear reactor may be used for other purposes besides the production of power. For example, it can with suitable modifications be employed as a source of neutrons and gamma rays, which have extensive utility as in the production of radioactive materials and isotopes. The reactor can be used to produce process steam, or to desalinize sea water, or for research purposes.

It will be understood that the invention is capable of obvious variations without departing from its scope.

In the light of the foregoing description, the following is claimed.

1. Method of operating a nuclear reactor and coincidently therewith of carrying out a gaseous phase radiation-induced chemical reaction, said reactor having a porous moderated fissile-containing fuel in the core thereof and also having adjacent said core a nuclear radiation-permeable fission fragment-impermeable zone which is in heat exchange relation with the core, which comprises: flowing coolant through said core in direct contact with the fuel, picking up in the coolant volatile nuclear fission fragments comprising xenon, krypton, and iodine, separating iodine from the coolant stream including iodine-135 and removing said iodine to a decay zone to permit decay to xenon including xenon-135, flowing the stream through an absorbing zone to absorb the xenon and krypton therefrom, recirculating the stream comprising stripped coolant to said reactor, adding to the recirculating stream xenon-135 from said decay zone and flowing the resulting stream through said reactor core as a coolant, thereby controlling the reactivity of the core at least in part by the presence of said xenon-135 and, further, prolonging the lifetime of the fuel in said core, coincidently with said cooling step adding to a chemical reactant a rare gas obtained as a product of the said method and selected from the class consisting of xenon, krypton, and mixtures thereof, flowing said reactant mixture as a stream through said reactor zone, irradiating the reactant mixture in said reactor zone by means of the nuclear radiation from the reactor core but not the fission fragments thereof while coincidently subjecting the reactant mixture to heat exchange with said reactor core, thereby converting said reactant to a product under the influence of said radiation and in the presence of said rare gas, flowing the resulting reaction mixture to a separating zone to separate reaction product, unchanged reactant, and rare gas, and recirculating said unchanged reactant to said zone in the reactor.

2. Method of claim 1 in which the rare gas added to the chemical reactant is xenon obtained from said decay zone.

3. Method of claim 1 in which the rare gas added to the chemical reactant is obtained by flowing said reactant through said absorbing zone at a time when the latter is spent.

4. Method of claim 1 in which the rare gas added to the chemical reactant is obtained from said separating zone.

5. Method of operating a nuclear reactor to produce power and coincidently therewith to carry out a gaseous phase radiation-induced chemical reaction, said reactor comprising a gas-cooled nuclear power reactor having a porous graphite-moderated fissile-containing fuel in the core thereof and also having a graphite reflector surrounding the core, which comprises: flowing helium coolant gas through said core in direct contact with the fuel, picking up in the coolant volatile nuclear fission fragments comprising xenon, krypton, bromine, and iodine, recovering heat from the hot coolant stream, then separating iodine from the coolant stream including iodine-135 and removing said iodine to a decay zone to permit the iodine to decay to xenon including xenon-135, then selectvely removing bromine from the stream by contact with a bromine absorber, then flowing the stream through a charcoal-containing absorbing zone to absorb the xenon and krypton from said stream, recirculating the stream comprising helium coolant to said reactor and coincidently with said last-mentioned flow of coolant to said reactor core, introducing a portion of the xenon-135 from said decay zone to said recirculating coolant and flowing the resulting mixture as a coolant through the reactor core, introducing another portion of xenon-135 from said decay zone to a chemical reactant and flowing the latter as a stream through said graphite reflector, thereby irradiating the reactant in the presence of said xenon by means of the nuclear radiation from the reactor core but not the fission fragments thereof while coincidently subjecting the reactant stream to heat exchange with said reactor core, flowing the reactant stream to a separating zone to separate reaction product, unchanged reactant, and xenon, and recirculating unchanged reactant to said reflector.

6. Method of operating a nuclear reactor and coincidently therewith of carrying out a radiation-induced rare gas-sensitized chemical reaction therein which comprises operating two flow loops in association with said reactor comprising a coolant flow through the reactor core and a chemical reactant flow through the reflector of the reactor, picking up volatile fission products including rare gases and iodine-135 by said coolant during flow of the same through the reactor core, converting iodine-135 to xenon-135 by decay, absorbing the rare gases in said coolant by passage of the latter through an absorber, thereby producing stripped coolant, adding said xenon-135 to the stripped coolant and recirculating the resulting mixture through said core, flowing a chemical reactant through said absorber to pick up adsorbed rare gases therein and then passing the resulting reactant mixture through said reactor reflector in heat exchange relation with said core, irradiating said reactant mixture during passage through the reflector by means of the nuclear radiation from the reactor core but in the absence of nuclear fission fragments, said rare gas acting as a sensitizer for said radiation chemical reaction, recovering the resulting reaction mixture and separating reaction product therefrom, recovering unchanged reactant and recirculating the same to said reflector in admixture with a rare gas produced within the method.

7. Method of operating a nuclear reactor and coincidently therewith of carrying out a radiation-induced rare gas-sensitized chemical reaction therein which comprises operating two flow loops in association with said reactor comprising a coolant flow through the reactor core and a chemical reactant flow through a zone of the reactor which is in heat exchange relation with the core and permeable to the nuclear radiation but not the fission fragments thereof, picking up volatile fission products including a rare gas by said coolant during flow of the same through the reactor core, removing rare gas from said coolant, thereby producing stripped coolant, recirculating the latter through said core, adding rare gas to a chemical reactant and passing the resulting reactant mixture through said reactor zone in heat exchange relation with said core, irradiating said reactant mixture during passage through the zone by means of the nuclear radiation from the reactor core but in the absence of nuclear fission fragments, said rare gas acting as a sensitizer for said radiation chemical reaction, recovering the resulting reaction mixture and separating reaction product therefrom, recovering unchanged reactant and recirculating the same to said zone in admixture with rare gas.

8. Method of operating a nuclear reactor and coincidently therewith of carrying out a gaseous phase radiation-induced chemical reaction, said reactor having a porous graphite-moderated fissile-containing fuel in the core thereof and a reflector surrounding the core, which comprises: flowing coolant gas through said core in direct contact with the fuel, picking up in the coolant volatile nuclear fission fragments comprising halogens and rare gases, separating said halogens from the coolant stream and then in a separate zone separating said rare gases therefrom, returning stripped coolant to said reactor for passage through the reactor core, coincidently with the flow of coolant through said core carrying out a chemical reaction in said reflector by first forming a reactant mixture comprising a chemical reactant and a rare gas produced within the said method, introducing the reactant mixture to one of a plurality of zones in said reflector which are disposed at varying distances from the reactor core with the nearest zone to the core being at a higher temperature than the most remote zone, selecting said zone in accordance with the temperature at which said chemical reaction is to proceed, irradiating the reactant mixture in said zone by means of the nuclear radiation from the reactor core but not the fission fragments thereof while coincidently subjecting the reactant mixture to heat exchange with said reactor core, said rare gas acting to sensitize said chemical reaction, thereby producing a reaction product, flowing the resulting reaction mixture to a separating zone to separate said reaction product from unchanged reactant and rare gas, and recirculating unchanged reactant to said reflector together with rare gas.

9. Method of operating a nuclear reactor to produce power and coincidently therewith to carry out a gaseous phase radiation-induced chemical reaction, said reactor having a porous moderated fissile-containing fuel in the core thereof and also having adjacent said core a plurality of nuclear radiation-permeable fission fragment-impermeable zones which are in heat exchange relation with the core and are disposed at varying distances therefrom such that the nearest zone is at a greater temperature than the most remote zone, which comprises: flowing coolant gas through said core in direct contact with the fuel, picking up in the coolant volatile nuclear fission fragments comprising xenon, krypton, and iodine, recovering heat from the hot coolant stream, then separating iodine from the stream including iodine-135 and removing said iodine to a decay zone to permit decay to xenon including xenon-135, flowing the stream through one of a series of absorbing zones to absorb the xenon and krypton from said stream, recirculating the stream comprising coolant to said reactor core, adding to the recirculating stream xenon-135 from said decay zone and flowing the resulting stream through said core as a coolant, thereby controlling the reactivity of the core at least in part by the presence of said xenon-135 and, further, prolonging the lifetime of the fuel in said core, coincidently with said flow of coolant gas forming a reactant mixture by adding to a chemical reactant a rare gas obtained as a product of the said method and selected from the class consisting of xenon, krypton, and mixtures thereof, flowing said reactant mixture as a stream through one of said zones selected in accordance with the temperature of said chemical reaction; irradiating the reactant mixture in said zone by means of the nuclear radiation from the reactor core but not the fission fragments thereof while coincidently subjecting the reactant mixture to heat exchange with said reactor core, thereby converting said reactant to a chemical product under the influence of said radiation and in the presence of said rare gas, flowing the resulting reaction mixture to a separating zone to separate reaction product, unchanged reactant, and rare gas, and recirculating said unchanged reactant to said zone in the reactor.

10. Method of claim 9 in which the rare gas added to the chemical reactant is xenon obtained from said decay zone.

11. Method of claim 9 in which the rare gas added to the chemical reactant is obtained by flowing said reactant through a spent absorber zone of said series.

12. Method of claim 9 in which the rare gas added to the chemical reactant is obtained from said separating zone.

References Cited by the Examiner

UNITED STATES PATENTS

| 3,072,548 | 1/1963 | Lucchesi et al. | 204—154 |
| 3,092,560 | 6/1963 | Reiter | 204—154 |
| 3,101,307 | 8/1963 | Barr et al. | 176—39 |
| 3,126,322 | 3/1964 | Suttle et al. | 176—51 |
| 3,154,473 | 10/1964 | Martin | 176—37 |
| 3,155,596 | 11/1964 | Frederick | 176—21 |

REUBEN EPSTEIN, *Primary Examiner.*